Sept. 19, 1939.   W. DOBLHOFF   2,173,793
ENDLESS-TRACK VEHICLE WITH AUXILIARY WHEELS
Filed May 25, 1937    3 Sheets-Sheet 1
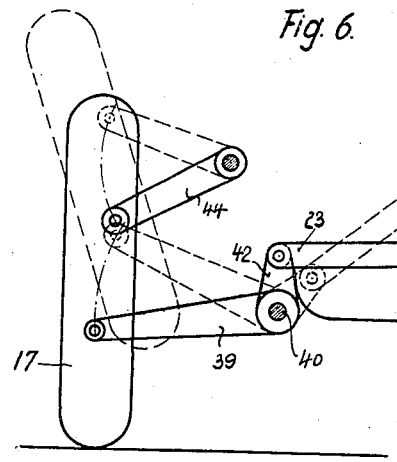
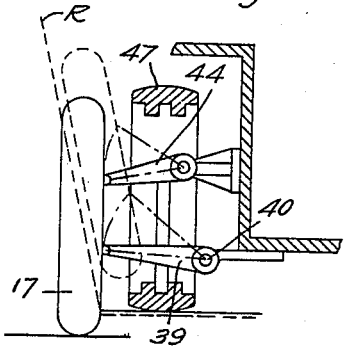
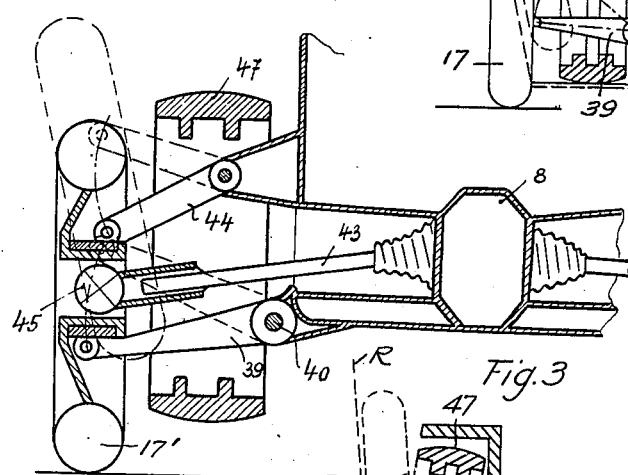
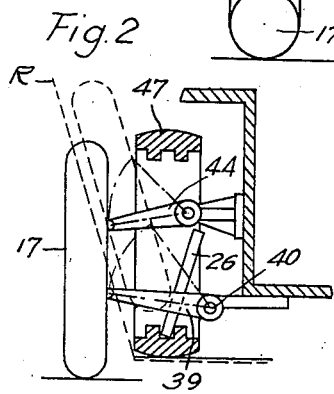
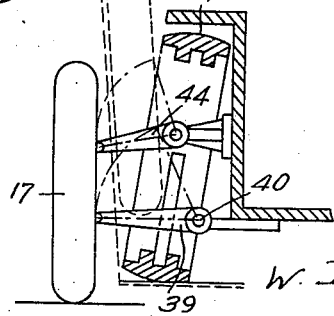
W. Doblhoff
INVENTOR
By: Glascock Downing & Seebohm
Attys.

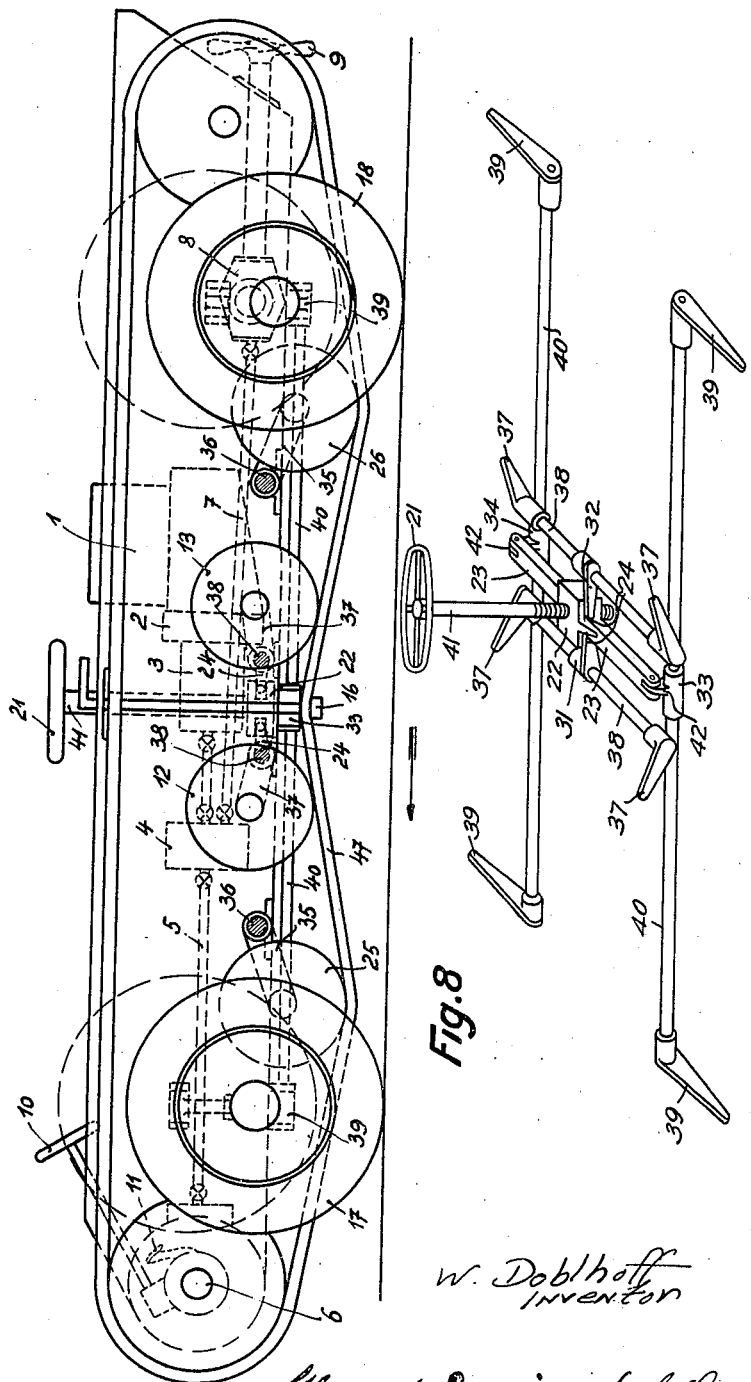

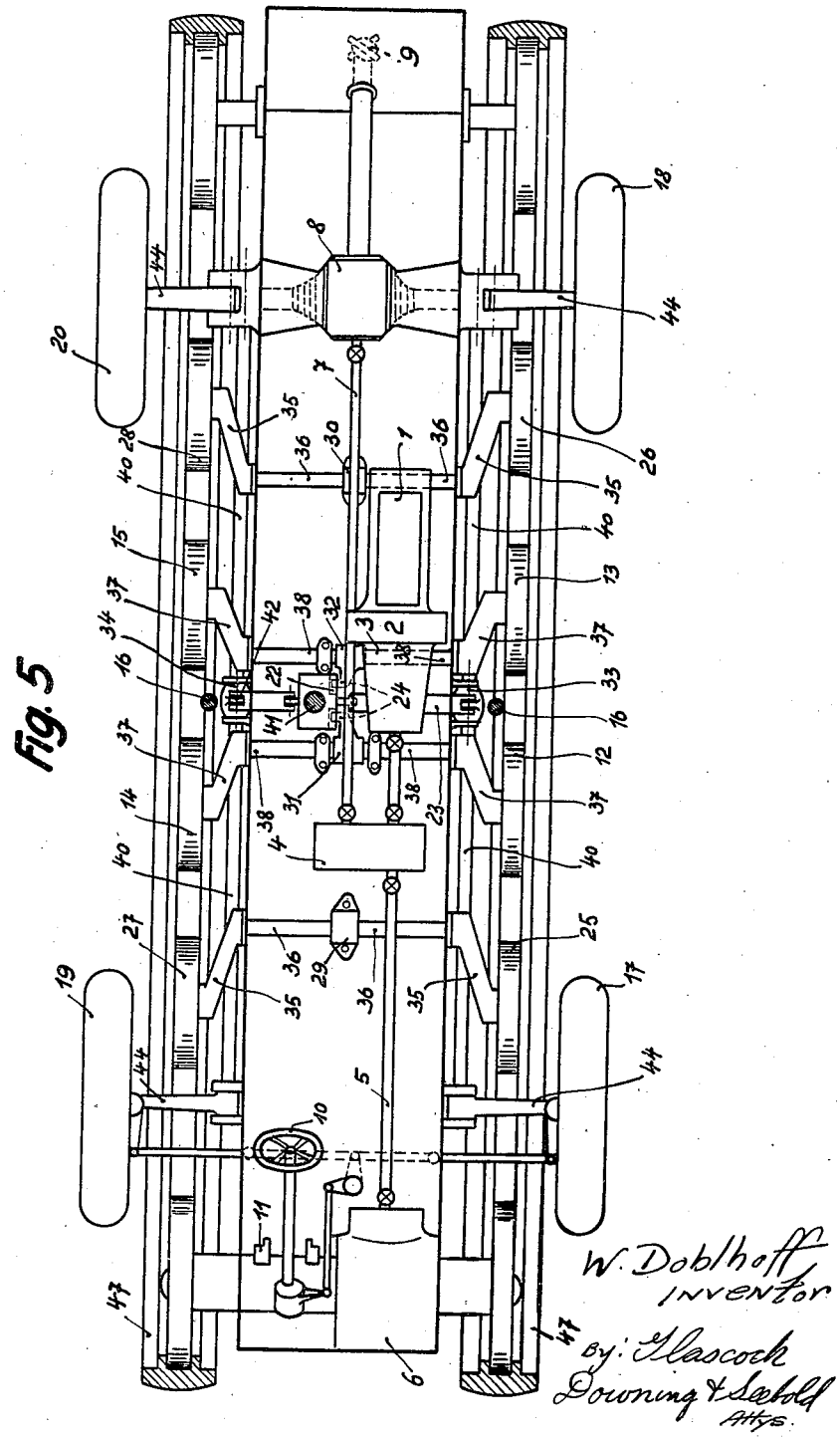

Patented Sept. 19, 1939

2,173,793

UNITED STATES PATENT OFFICE 2,173,793

ENDLESS-TRACK VEHICLE WITH AUXILIARY WHEELS

Walther Doblhoff, Vienna, Austria, assignor to the firm Österr. Saurer-Werke Aktiengesellschaft, Vienna, Germany Application May 25, 1937, Serial No. 144,720
In Austria November 23, 1935

12 Claims. (Cl. 180—9.1)

In vehicles which can be used alternatively with endless-track drive and with wheel drive, the mounting of the wheels at the sides of the endless tracks has the disadvantage that the vehicle becomes too broad, and thereby gives rise to difficulties, particularly when operating on endless tracks, when traversing narrow roads sunk below the level of the surrounding ground. The object of the present invention is to obviate this disadvantage, devices being provided by means of which not only when operating on wheels but particularly when operating on endless tracks, the breadth of the vehicle is kept substantially as small as the endless tracks allow, particularly near the ground, with a supporting breadth of the endless tracks which is as great as possible.

The invention consists in the feature that the wheels are raised, when operating with endless tracks, in such a way that they are rocked or otherwise introduced, at least with the lower portion, into the interior of the endless track, preferably by a rocking movement, performed during the raising of the wheels, about an axis parallel or nearly parallel to the longitudinal axis of the vehicle, in such a way that they project, at least with their lower portion, very little or not at all beyond the breadth of the vehicle determined by the distance between the endless tracks.

A preferred arrangement is one in which the wheels are guided on links of such length that the wheels, in ascending, particularly with their lower portion, enter as far as possible into the interior of the endless tracks.

The introduction or rocking-in of the wheels may be materially assisted, according to a further feature of the invention, by adopting oblique supporting rollers for the endless tracks, or oblique endless tracks, whereby it is also rendered possible for the upper portion of the rocked-in wheels to project but little or not at all beyond the breadth of the endless tracks.

The transition from endless-track travel to wheel travel is effected by lowering the wheels, and, it may be, through simultaneous raising of the endless track. According to the invention, however, the endless track is but little raised, if at all, in the region of the road wheels, whereas in the centre it may be considerably raised. The possibility is thereby provided, that the road wheels, when executing stearing movements, may rock deeply into the interior of the endless tracks, and may therefore be arranged laterally close beside the endless tracks, so that also when travelling on wheels a comparatively narrow vehicle can be obtained, whereas the raising of the endless tracks in the centre insures a sufficient clearance from the ground at the place where clearance of the vehicle from the ground is most important, namely between the axles, and therefore freedom of movement of the vehicle regardless of irregularities of the road surface.

The invention also provides devices which serve to simplify the design of the vehicle and to enable it to be quickly and easily operated. In this connection a particular effort is made to facilitate the change from one method of operation to the other while the vehicle is travelling.

One embodiment of the invention is diagrammatically illustrated by way of example in the accompanying drawings, in which—

Figures 1 to 3 show various arrangements in cross section of wheels capable of being rocked-in, while Figures 4 and 5 illustrate one constructional example of a vehicle according to the invention in elevation and in plan respectively.

Figure 6 shows diagrammatically the means for raising and rocking-in the road wheels, and Figure 7 illustrates diagrammatically in cross section an arrangement of the driving wheels.

Figure 8 shows in perspective view the most important parts for lifting and lowering the road wheels and the supporting rollers for the belts.

Figure 1 shows a cross section through a vehicle according to the invention in which the position of any of the wheels 17, 18, 19 and 20 in a lowered condition for travel on wheels and in a raised condition for travel on endless tracks is represented. As may be seen in the first three figures and as even partly indicated in Figure 8, the wheels 17, 18, 19, 20 are arranged on pairs of links 39, 44 or the like. These links are swiveled to the road wheels and the frame of the vehicle, making it possible to lift the road wheels with respect to the frame of the vehicle. The hinging points and lengths of the links 39, 44 are selected in such a manner that the road wheels when lifted are simultaneously swung as far as possible into the interior space and within the outline of the belts or tracks 47, especially their lower parts, as indicated in broken lines in Figures 1, 2 and 3.

According to Figure 2 the supporting rollers 26 of the endless tracks are disposed in a slightly oblique position. Owing to this oblique position of the carrying rollers of the endless tracks the rocking-in of the wheels can be effected even further than in Figure 1.

In this case the surface breadth of the sunken road that can still be traversed need not be greater than the breadth across the endless tracks, while the sides of the sunken road must be less steeply inclined.

According to Figure 3, in consequence of the obliquity of the endless tracks as a whole, though the supporting breadth of the tread portions of the endless tracks is maintained, the wheels can be rocked-in, not only in the lower portion but also in the upper portion, so far that the sole breadth of the sunken road may be equal to the breadth of the endless tracks, and the side walls of the sunken road may be nearly vertical.

In Figures 1 to 3, the profile of a sunken road that can be traversed on endless tracks with the wheels rocked-in, is shown by the dotted lines R.

According to the invention the road wheels 17, 18, 19, 20 and the supporting rollers 12, 13, 14, 15, and 25, 26, 27, 28 of the endless tracks are arranged on links, which are subject to spring action. The springing is here effected by springs or bundles of springs acting upon the links at the pivotal points connecting them with the body of the vehicle, as a result of which the rocking of the links 39 when adjusting the road wheels 17, 18, 19, 20 or the rocking of the links 37 when adjusting the endless-track carrying rollers is materially simplified. In the embodiment illustrated in the drawings the springs are assumed for the sake of simplicity to be simple torsion bars 38 and 40 to which the links 37 and 39 are attached.

One of the links of every pair of links carrying a road wheel, e. g., the link 39, is attached to a torsion bar 40 at the point of the pivotal connection of said link to the vehicle body. As in the drawings, the torsion bars 40 which form the cushioning of the wheels, are common to all the wheels upon each side of the vehicle. The torsion bars 40 are attached in the center to the vehicle body by means of brackets 33, 34. Said brackets are rotatably supported on the vehicle body so as to insure the lifting of the wheels through the rotation of said brackets 33, 34 and the torsion bars 40.

The rotating of the brackets 33, 34 carrying the springs of the road wheels 17, 18, 19 and 20 is effected by rotating a screw spindle 41, shown in Figures 6 and 8, which is provided with a hand wheel 21, and which adjusts a nut 22, which is attached by way of links 23 to lever-like projections 42 on the brackets 33 and 34, in such a way that the said nut, in its raising movement, shifts the brackets 33, 34, and therefore, by way of the torsion bars 40, the links 39, in the direction of a raising movement of the road wheels.

The rollers 25, 26, 27, 28 and 12, 13, 14, 15 arranged on crank levers 35, 37, serve as supporting rollers for the belts. Said crank levers are firmly secured on the ends of transverse torsion bars 36, 38 attached at the center to the vehicle body, thus serving as cushioning means for the supporting rollers. The supporting rollers 25, 26, 27, 28 are not adjustable, whereas the supporting rollers 12, 13, 14, 15 definitely are adjustable. Consequently, the torsion bars 36 to which the crank levers 35 are attached, which carry the non-adjustable supporting rollers 25, 26, 27, 28, are clamped fast to the vehicle body at 29 and 30 respectively. On the other hand, the torsion bars 38, to which the crank levers 37 are attached, which carry the adjustable supporting rollers 12, 13, 14, 15, are connected to the vehicle body by means of rotatable supports 31 and 32 respectively in the form of blocks or brackets, which are clamped on the torsion bars 38, and the rotation of the same causes the displacement of the supporting rollers 12, 13, 14, 15.

In the embodiment illustrated in the drawings the adjusting of the endless-track carrying rollers 12, 13, 14 and 15 is effected jointly with the adjusting of the road wheels by means of the hand wheel 21 in such a way that during the lowering movement of the wheels, the carrying rollers are raised, and conversely. For this purpose the brackets or blocks 31, 32, which are operative for the shifting of the carrying rollers, are constructed with lever-like projections 24, connected with the nut 22 whereby during raising movement of the nut, the bars 38 are turned in the direction of a lowering movement of the carrying rollers, whereas the bars 40 are turned in the proper direction to raise the wheels.

In Figures 6 and 7, the rollers for the belt or endless track are omitted for clarity in disclosing the links raising and lowering the wheels 17 and 17', respectively, and in fact, even the belt or track is omitted from Figure 6.

Figures 4 and 5 show the vehicle with the road wheels 17, 18, 19 and 20 lowered for the vehicle to travel thereon. As Figure 4 particularly shows, the endless tracks can be raised relatively to the vehicle body, when travelling on the wheels, for the purpose of increasing the clearance from the ground, this raising of the endless tracks when travelling on said wheels being affected, as the drawing shows, more particularly in the center, between the axles, where clearance from the ground has to be greatest, whereas in the neighbourhood of the wheels little or no raising of the endless tracks relatively to the vehicle body takes place. The possibility is thereby provided of rocking the pivoted wheels into the interior of the endless track when said wheels are turned for steering movement.

When changing over from endless track to wheel drive, the wheels 17, 18, 19 and 20 are therefore lowered into the travelling position, and the central endless-track supporting rollers 12, 13, 14 and 15 are raised, the front and rear endless-track-supporting rollers 25, 26, 27 and 28 remaining in their position. The endless-track band itself may be raised with them, in a relaxed condition, by means of hooks 16, which engage under it. In the embodiment illustrated by way of example in the drawings, the lowering of the road wheels is effected simultaneously with the raising of the endless-track supporting rollers.

The vehicle as shown in Figures 4 and 5, is constructed in such a way that from the motor 1, which, for the best utilisation of the space available, is arranged at the rear and at the side, the drive is effected by way of a clutch 2 and a change-speed gear 3 to an auxiliary gear 4, which serves, either by means of the shaft 5 to actuate the endless-track gear 6 provided in a known manner with steering clutches and brakes, or, by means of the shaft 7, to actuate a wheel drive 8 constructed with swing axle, or else to actuate both drives at the same time.

It is therefore possible, with this auxiliary gear 4, during the transition from endless-track operation to wheel operation and conversely, to keep both drives in motion, so that the change can be effected without stopping the vehicle. For this purpose it is necessary at least at one speed ratio that the peripheral speed of the wheels and of the endless tracks should be the same. After the change has been effected, the endless tracks or the wheels are disconnected from the drive.

The driving shafts 43 for the road wheels may be constructed for example as grooved telescopic shafts, in such a way that a change of length is possible during the rocking movement of the wheels, as indicated in Figure 7.

In the drive for the wheels Cardan joints 45 are provided, as in the case of front-wheel drives, in order that it may also be possible to rock-in even positively driven wheels.

With the endless-track drive 6 are directly assembled the steering means 10 and the actuating pedals 11 for braking the endless-track drive, and the steering clutches of the endless track-drive.

For the driving of the road wheels, on account of the great deflections which the driving shafts must execute when the wheels are rocked up and down for endless-track and wheel operation, a construction known in itself, of toothed-wheel gear or differential with rockable toothed wheels serving for driving the side shafts is advantageous, more particularly a construction in which the pair of wheels serving for driving a driving-wheel shaft is journalled in a carrying member, which is secured upon the swinging axle member pertaining to the driving-wheel shaft in question. Such a gear has the further advantage that it also enables the driving shaft to extend through the longitudinally arranged differential. It is therefore also possible to utilize such a gear for the driving of an auxiliary drive, such for example as a propeller, arranged behind the rear axle gear. Such a gear is therefore advantageous for a form of the invention in which a propeller 9 can propel the vehicle when it is used in a known manner as a boat.

What I claim is:

1. In a convertible vehicle of the type having endless tractor tracks and road wheels normally spaced laterally outside of said tractor tracks in operative position and being capable of being raised into inoperative position, a rigid frame, operative means upon the opposite sides of said frame forming mountings for said wheels to shift and guide the same from operative to inoperative position and vice versa, means for supporting and guiding said tractor tracks, and additional means upon said frame associated with said wheels and operating during the raising of the wheels into inoperative position to cause at least the lower portions thereof to be introduced into the space within the outline of said tractor tracks.

2. In a convertible vehicle of the type having endless tractor tracks and road wheels normally spaced laterally outside of said tractor tracks in operative position and being capable of being raised into inoperative position, a rigid frame, swingable means articulated to said frame upon axes practically parallel with the longitudinal axis of the frame and forming mountings for said wheels to swing and guide the same from operative to inoperative position and vice versa, means for supporting and guiding said tractor tracks, and additional means upon said frame associated with said wheels and operating during the raising of the wheels into inoperative position to cause at least the lower portions thereof to be introduced into the space within the outline of said tractor tracks.

3. In a convertible vehicle of the type having endless tractor tracks and road wheels normally spaced laterally outside of said tractor tracks in operative position and being capable of being raised into inoperative position, a rigid frame, shaft means upon said frame disposed practically parallel with the longitudinal axis of the frame, links mounted at their inner ends upon said shaft means and connected to said wheels at their other ends and forming mountings for said wheels to swing and guide the same from operative to inoperative position and vice versa, means for supporting and guiding said tractor tracks, actuating means for imparting limited rotation to said shaft means in order to raise or lower said road wheels, and additional links also connected to said wheels and articulated to said frame swinging and operating during the raising of the wheels into inoperative position to cause at least the lower portions thereof to be introduced into the space within the outline of said tractor tracks.

4. A convertible vehicle according to claim 3, wherein the shaft means comprise torsion bars, and the links and the actuating means engage said torsion bars at different points of said bars so as to cause the same to act effectively by torsion as cushioning means for resiliently supporting said wheels in operative position of the latter.

5. A convertible vehicle according to claim 1, wherein the endless tractor tracks are disposed upon both sides of the frame and the means for supporting and guiding said endless tractor tracks comprise supporting rollers, supporting arms for said rollers, and torsion bars disposed transversely to the longitudinal axis of the frame and at the ends thereof carrying said supporting arms.

6. A convertible vehicle according to claim 1, wherein supporting rollers are associated at the sides of the frame with the endless tractor tracks, and wherein said rollers in raised position of the road wheels are disposed in inclined positions so as to incline the tractor tracks inwardly toward the frame in order to increase the access of the raised road wheels to the space within the outline of the tractor tracks and reduce the overall width of the vehicle when said wheels are raised.

7. A convertible vehicle according to claim 1, wherein supporting rollers are associated at the sides of the frame with the endless tractor tracks, and said rollers in raised position of the road wheels are disposed in inclined positions so as to incline the tractor tracks inwardly toward the frame in order to increase the access of the raised road wheels to the space within the outline of the tractor tracks and reduce the overall width of the vehicle when said wheels are raised, and wherein the additional means causing the lower portions of the road wheels to be introduced in said space within the tractor tracks cause said wheels to be inclined inwardly at the bottom toward said frame.

8. A convertible vehicle according to claim 1, wherein supporting rollers are disposed at the sides adjacent the ends and intermediate portions of the frame, operative means upon said frame for raising and lowering the intermediately disposed rollers, means rigidly supporting the end rollers upon the frame in order to maintain the tractor tracks in positions allowing control of the road wheels and freedom of movement as well as freedom to rotate in operative position.

9. A convertible vehicle according to claim 1, wherein supporting rollers are disposed at the sides adjacent the ends and intermediate portions of the frame, operative means upon said frame for raising and lowering the intermediately disposed rollers, in order to shift the tractor tracks from operative to inoperative positions and vice versa, and means causing the operative means shifting the intermediate rollers to act in opposite manner to the operative means for the road wheels so that said wheels are lowered when said intermediate rollers are raised and vice versa, the additional means introducing portions of the wheels into the space within the outline of the tractor tracks being effective to incline the lower portions of said wheels inward toward the frame in raised inoperative position of the wheels.

10. A convertible vehicle according to claim 1, wherein supporting rollers are disposed at the sides adjacent the ends and intermediate portions of the frame, supporting arms upon said intermediate portions of the frame supporting the intermediate rollers, with torsion bars disposed transversely of the longitudinal axis of the frame carrying arms at the ends thereof which support the end rollers, wherein the operative means for the road wheels comprise torsion bars disposed substantially parallel to said longitudinal axis, swingable links having their inner ends upon said last torsion bars connected to the road wheels upon their outer ends, and the additional means of the road wheels comprise further swingable links connected at their inner ends to said frame and at their outer ends to said wheels, and actuating means for imparting rotation simultaneously to the longitudinal and transverse torsion bars, said arms and links, as well as actuating means being connected to their respective torsion bars at different spaced points in order to cause said torsion bars to form resilient cushioning means for the road wheels and the endless tractor tracks.

11. A convertible vehicle according to claim 1, wherein supporting rollers are disposed at the sides adjacent the ends and intermediate portions of the frame, supporting arms upon said intermediate portions of the frame supporting the intermediate rollers, with torsion bars disposed transversely of the longitudinal axis of the frame carrying arms at the ends thereof which support the end rollers, wherein the operative means for the road wheels comprise torsion bars disposed substantially parallel to said longitudinal axis, swingable links having their inner ends fixed upon said last torsion bars connected to the road wheels upon their outer ends, and the additional means of the road wheels comprise further swingable links connected at their inner ends to said frame and at their outer ends to said wheels actuating levers for imparting rotation to the longitudinal and transverse torsion bars, said arms and links, as well as actuating means engaging their respective torsion bars at different spaced points in order to cause said torsion bars to form resilient cushioning means for the road wheels and the endless tractor tracks, and wherein an actuating device is capable of swinging said actuating levers so as to cause the simultaneous raising of the road wheels to inoperative position and lowering of the supporting rollers of the tractor tracks and vice versa the lowering of the road wheels to operative position and simultaneous raising of the supporting rollers of the tractor tracks.

12. A convertible vehicle according to claim 1, wherein the operative means for the road wheels comprise swingable arms articulated upon the opposite sides of the frame and are connected at their outer ends to the wheels and the additional means comprise further swingable arms also articulated upon opposite sides of the frame and at their outer ends likewise connected to the road wheels, the first swingable arms and the additional swingable arms being arranged in pairs with one spaced above the other and one arm in each pair being longer than the other, so that the wheel to which each pair is connected will be swung from a given operative position to a raised inoperative position at an angle to the said operative position of the wheel.

WALTHER DOBLHOFF.